United States Patent
Timner et al.

(10) Patent No.: US 10,506,613 B2
(45) Date of Patent: Dec. 10, 2019

(54) METHOD AND RATE CONTROLLING NODE FOR PROVIDING DATA RATE FOR DATA COMMUNICATION

(71) Applicant: Telefonaktiebolaget LM Ericsson (publ), Stockholm (SE)

(72) Inventors: Ylva Timner, Luleå (SE); Jonas Pettersson, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 39 days.

(21) Appl. No.: 15/545,860

(22) PCT Filed: Jan. 27, 2015

(86) PCT No.: PCT/SE2015/050081
§ 371 (c)(1),
(2) Date: Jul. 24, 2017

(87) PCT Pub. No.: WO2016/122360
PCT Pub. Date: Aug. 4, 2016

(65) Prior Publication Data
US 2017/0374671 A1    Dec. 28, 2017

(51) Int. Cl.
*H04W 72/08* (2009.01)
*H04W 72/12* (2009.01)
(Continued)

(52) U.S. Cl.
CPC ......... *H04W 72/085* (2013.01); *H04W 24/08* (2013.01); *H04W 72/1257* (2013.01); *H04W 52/367* (2013.01)

(58) Field of Classification Search
CPC . H04W 24/08; H04W 52/367; H04W 72/085; H04W 72/1257
See application file for complete search history.

(56) References Cited

U.S. PATENT DOCUMENTS 8,723,913 B2   5/2014   Obaidi et al.
2005/0259661 A1* 11/2005  Ishii .................. H04L 47/14
                                                370/395.4
(Continued)

FOREIGN PATENT DOCUMENTS

EP         1566926 A1    8/2005

OTHER PUBLICATIONS

Argiriou, Nikos et al., "Channel Sharing by Rate-Adaptive Streaming Applications", IEEE INFOCOM 2002, Jan. 2002, 753-762.
(Continued)

*Primary Examiner* — Khaled M Kassim
*Assistant Examiner* — Zhaohui Yang
(74) *Attorney, Agent, or Firm* — Patent Portfolio Builders, PLLC (57) ABSTRACT

A method and rate controlling node (206) for providing a recommended data rate for a communication i of data on a radio channel between a data sending node (200) and a data receiving node (202) over a shared radio link (204). The rate controlling node (206) determines a fair data rate $R_i$ for the data communication based on a current load on the shared radio link (204), and also determines a maximum flow data rate $R_{max,i}$ for the data communication i a highest possible data rate that the data sending node (200) is able to use in the data communication. The rate controlling node (206) then signals (2:5) a recommended data rate for the data communication i as a minimum of the determined fair data rate $R_i$ and the determined maximum flow data rate $R_{max,i}$ to the data sending node (200).

13 Claims, 3 Drawing Sheets

(51) Int. Cl.
*H04W 24/08* (2009.01)
*H04W 52/36* (2009.01)

(56) References Cited

U.S. PATENT DOCUMENTS

| | | |
|---|---|---|
| 2009/0154353 A1 | 6/2009 | Loiacono et al. |
| 2011/0141890 A1* | 6/2011 | Giaretta ............... H04W 28/20 370/232 |
| 2012/0086767 A1 | 4/2012 | Lau et al. |
| 2016/0156563 A1 | 6/2016 | Timner et al. |
| 2017/0150480 A1* | 5/2017 | Kim ...................... H04W 72/02 |

OTHER PUBLICATIONS

Timner, Ylva, "Network Assisted Rate Adaptation for Conversational Video over LTE, Concept and performance evaluation", ACM SIGCOMM Capacity Sharing Workshop, Aug. 18, 2014, 1-7.
Office Action issued in application No. 15704614.5 dated Sep. 26, 2018; 6 pages.

* cited by examiner

METHOD AND RATE CONTROLLING NODE FOR PROVIDING DATA RATE FOR DATA COMMUNICATION

TECHNICAL FIELD

The present disclosure relates generally to a method and a rate controlling node for providing a recommended data rate for a communication of data between a data sending node and a data receiving node over a shared radio link.

BACKGROUND

When data is to be communicated between two end-points over a network for telecommunication involving at least one radio link, the end-points need to know which rate they should use when communicating the data so that they can prepare and set up their communication equipment accordingly, which is commonly referred to as "rate adaptation", provided that the data rate is adaptive and can be selected. Throughout this disclosure, the term "data rate" is used to denote how much data to communicate per time unit, which may be expressed as information bits per second, known as the bitrate. Other rates which are representative for the data rate may also be used in this context such as frame rate or block rate.

Some non-limiting but illustrative examples of data communication include voice and video calls, streaming of audio and visual content e.g. music and video, on-line games, web browsing, file downloads, exchange of information e.g. in the form of files, images and notifications, and so forth, i.e. any kind of data that can be communicated between end-points over a telecommunication network. It is common that the end-points themselves initially negotiate and agree on which data rate to use before the communication begins, depending on their respective capabilities.

Thus, in order to communicate the data both end-points must be able to use the same encoding and communication schemes which may be determined by exchanging their capabilities with each other in the negotiation. In this case the rate adaptation is controlled by the end-points. It is also possible that the rate adaptation is controlled by an intermediate network node which selects a suitable data rate for the forthcoming data communication and sends a recommendation or instruction to at least the data sending node to use this data rate.

Figure 1:
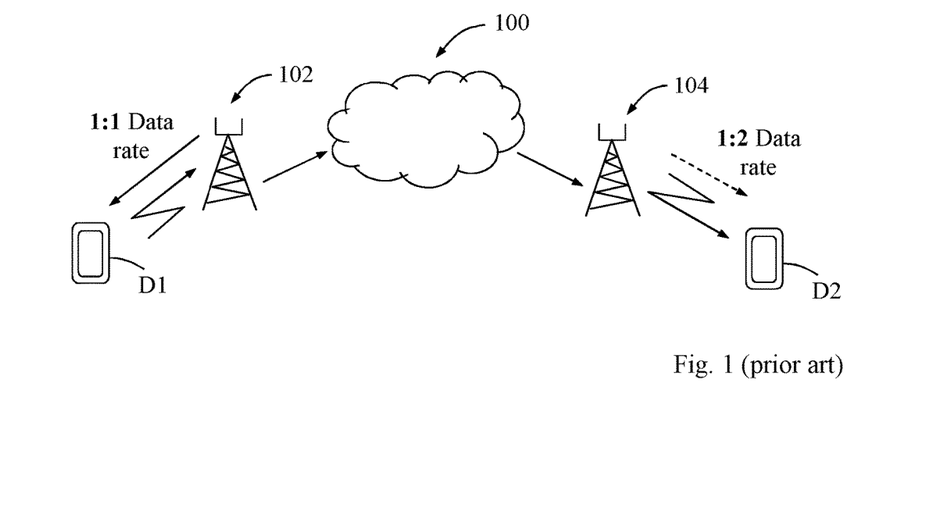
FIG. 1 is a communication scenario illustrating how data rate can be controlled for a communication of data between two wireless devices, according to the prior art.

FIG. 1 illustrates a communication scenario where data is communicated from one wireless device D1 to another wireless device D2 over an intermediate communication network 100, the devices D1, D2 thus being two end-points which can be generally referred to as a data sending node and a data receiving node, respectively. The data is transmitted over a first radio link from the data sending node D1 to its serving network node 102, typically a base station or the equivalent. The data is then transported over various nodes of the network 100 until another network node 104 serving the data receiving node D2 finally transmits the data over a second radio link to D2. The network nodes 102 and 104 may belong to the same radio access network or to separate radio access networks.

In general, it is mostly desirable to use as high data rate as possible in order to achieve good or at least satisfactory service performance in the data communication. However, if the data rate is too high, a radio link involved in the data communication may not have sufficient capacity and/or quality to transport the data with such high rate, particularly when the radio link is shared by multiple communications and the current traffic load is high, which typically results in deteriorated service performance due to interruptions of the data flow. It has therefore been proposed to employ rate adaptation for a communication of data involving at least one radio link where a suitable data rate is selected which is adapted to the link quality and/or the current traffic load on that radio link which both typically fluctuate over time.

An example of the above is illustrated in FIG. 1 where the network node 102 determines a suitable data rate to recommend for the data communication depending on the current state of the first radio link in terms of load and/or quality. The network node 102 then signals the recommended data rate to the data sending node D1, as illustrated by an action 1:1. Since two radio links are involved in this data communication, it may be desirable to adapt the recommended data rate to both these links by not exceeding the rate allowed by the "slowest" one of the first and second radio links, in order to achieve a smooth end-to-end data communication, e.g. without getting interruptions at the data receiving node D2. Another action 1:2 illustrates that the network node 104 may thus signal a recommended data rate to the data receiving node D2 as well.

US 2012/0086767 A1 discloses how a frame rate of a video call can be adapted based on link quality of one or both of two telecommunication devices where the rate adaptation is controlled by an intermediate server of a telecommunications service provider.

It is however a problem that the recommended data rate may still not be optimal, suitable or even possible to use in a data communication between end-points due to various limitations experienced by one or both of the communicating end-points, particularly when a shared radio link is used which is thus utilized for more than one communication. Therefore, the data communication may be executed with less performance and/or efficiency than what would otherwise be possible to achieve under the prevailing circumstances. US 2012/0086767 A1 does not address the scenario with shared radio link.

SUMMARY

It is an object of embodiments described herein to address at least some of the problems and issues outlined above. It is possible to achieve this object and others by using a method and a rate controlling node as defined in the attached independent claims.

According to one aspect, a method is performed by a rate controlling node for providing a recommended data rate for a communication i of data on a radio channel between a data sending node and a data receiving node over a shared radio link. In this method the rate controlling node determines a fair data rate $R_i$ for the data communication based on a current load on the shared radio link, and also determines a maximum flow data rate $R_{max,i}$ for the data communication i as a highest possible data rate that the data sending node is able to use in the data communication. The rate controlling node then signals a recommended data rate for the data communication i as a minimum of the determined fair data rate $R_i$ and the determined maximum flow data rate $R_{max,i}$ to the data sending node.

According to another aspect, a rate controlling node is arranged to provide a recommended data rate for a communication i of data on a radio channel between a data sending node and a data receiving node over a shared radio link. The rate controlling node comprises a processor and a memory, said memory comprising instructions executable by said processor whereby the rate controlling node is operative to:

determine a fair data rate $R_i$ for the data communication based on a current load on the shared radio link, determine a maximum flow data rate $R_{max,i}$ for the data communication as a highest possible data rate that the data sending node is able to use in the data communication, and signal a recommended data rate for the data communication as a minimum of the determined fair data rate $R_i$ and the determined maximum flow data rate $R_{max,i}$ to the data sending node.

In another aspect, the rate controlling node comprises a logic module configured to determine a fair data rate $R_i$ for the data communication based on a current load on the shared radio link, and to determine a maximum flow data rate $R_{max,i}$ for the data communication based on a current quality of the radio channel used for the data communication and device capabilities of at least the data sending node, and a signaling module configured to signal a recommended data rate for the data communication as a minimum of the determined fair data rate $R_i$ and the determined maximum flow data rate $R_{max,i}$ to the data sending node.

The above method and rate controlling node may be configured and implemented according to different optional embodiments to accomplish further features and benefits, to be described below.

A computer program is also provided comprising instructions which, when executed on at least one processor in the score management node, cause the at least one processor to carry out the method described above for the score management node. A carrier is also provided which contains the above computer program, wherein the carrier is one of an electronic signal, optical signal, radio signal, or a non-tangible computer readable storage medium.

BRIEF DESCRIPTION OF DRAWINGS

The solution will now be described in more detail by means of exemplary embodiments and with reference to the accompanying drawings, in which.

DETAILED DESCRIPTION

A solution for rate adaptation in a data communication between two end-points involving a radio channel on a shared radio link used by multiple communications is provided as follows. Each communication on the shared radio link use radio resources from a common pool provided by the shared radio link, although the communications have individual radio conditions e.g. depending on the position of each sending end-point and any interference occurring at that position. In this solution it is recognized that the data rate can be made more suitable and effective for the communication when it is adapted depending on both the current load on the shared radio link and the abilities of the end-points according to the current conditions of the radio channel. Various embodiments are described in this disclosure which can be used for providing a recommended data rate for a communication of data between a data sending node and a data receiving node over a shared radio link. These embodiments are described in terms of a single data flow on a radio channel used for the data communication but may be applicable also when two or more separate data flows are involved in the data communication between the two end-points over the shared radio link.

The embodiments will be described in terms of functionality in a "rate controlling node" which may be implemented in a node of the network, e.g. a base station serving one or both of the communicating end-points. The rate controlling node may also be divided into a "rate adaptor" that determines the recommended data rate and a "rate enforcer" that makes sure the recommended data rate is used. In that case the rate enforcer could be implemented in a network node or in one of the communicating end-points.

Briefly described, the rate controlling node determines a "fair data rate" for the data communication based on a current load on the shared radio link. In this description, the term "fair data rate" is used to represent a data rate that can be obtained for the data communication by dividing the total amount of available radio resources of the shared radio link into "fair" parts, portions or ratios which are assigned to respective communications on the shared radio link. The fair data rate is thus an estimated rate that the present data communication can achieve given its assigned share of the radio resources. The rate controlling node is able to determine "fair data rates" for all rate controlled data communications based on the load on the shared radio link. These should be determined so that the total expected resource consumption of all data communications does not exceed the total amount of resources on the shared radio link. The division of resources between data communications can be decided according to some rule which may be referred to as a "fairness criterion", e.g. dictating that all data communications should get an equal share of the available radio resources, or that all data communications should get the same data rate. The rule or fairness criterion may also dictate that some communications are prioritized and hence get more resources on the expense of other communications.

The fair data rate may thus be estimated for an equal split between the data communications currently using the shared radio link. For example, if the shared radio link is used by three communications, each communication will be able to use one third of the total resources according to such an equal split. However, other splits or ratios are also possible, e.g. depending on the service requirements of the communications on the shared radio link such that one communication may get a larger portion of the radio resources than another communication e.g. to satisfy some service requirements. The fair data rate thus indicates basically what data rate is possible given the current load on the shared radio link which can be expressed in terms of the number of ongoing data communications and how much radio resources they occupy.

The rate controlling node also estimates a "maximum flow data rate" for the data communication as a highest possible data rate that the data sending node is able to use in the communication. The maximum flow data rate may be determined based on a current quality of the radio channel used for the data communication and/or based on capabilities of at least the data sending node. For example, the capabilities of the data sending node may include a maximum bitrate that the node is capable of using which thereby limits the maximum flow data rate. The maximum flow data rate thus indicates what data rate is possible from this data sending node regardless of the amount of radio resources that are made available for its communication.

It is also recognized that the "slowest" one of the above two data rates constitutes effectively a limit to what data rate is possible to use given the current circumstances. The rate controlling node then selects the minimum, i.e. the lowest value, of the determined fair data rate and maximum flow data rate and signals it as a recommended data rate to the data sending node for use in the data communication. In this description, the term "recommended data rate" should be understood as a data rate that the communicating nodes are recommended, or instructed, to use in order to achieve a realistic and optimal, suitable or at least satisfactory service performance during the communication of data.

Figure 2:
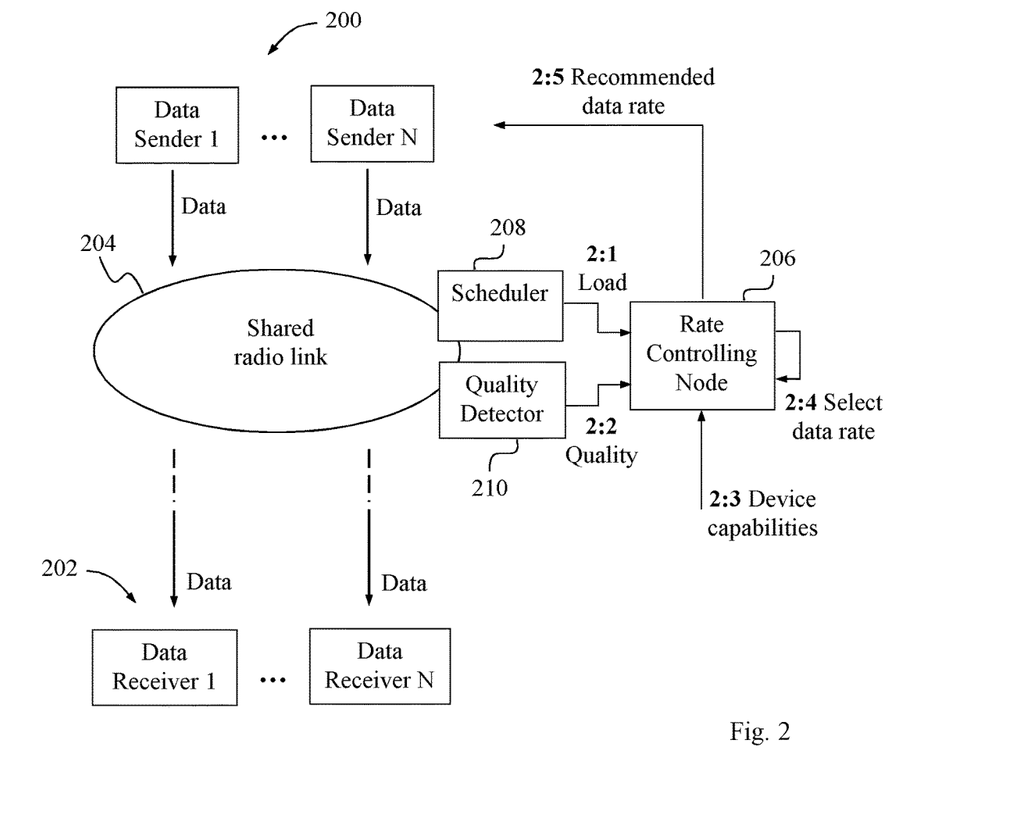
FIG. 2 is a block diagram illustrating how the data rate can be controlled for a data communication from a data sending node using a shared radio link, according to some possible embodiments.

FIG. 2 illustrates an example of a communication scenario with N communications of data from N data sending nodes 200 to respective N data receiving nodes 202 using radio resources of a shared radio link 204. The radio resources may be equally split amongst the N communications such that each communication can use 1/N of the total amount of available radio resources of the shared radio link 204. However, other ratios are also possible depending on service requirements, as mentioned above. In this example, a rate controlling node 206 operates as an intermediate network node to provide a recommended data rate as signaled to the respective data sending nodes 200 for use in their respective communications.

This example illustrates a single shared radio link which the data sending nodes 200 are using for transmitting data on the uplink, all being served by a network node, not shown, of a wireless access network which provides the shared radio link e.g. in a cell. The data receiving nodes 202 receive that data in some manner, e.g. on respective downlink transmissions from respective serving network nodes, not shown, which is however outside the scope of this solution. This example only relates to the shared radio link 204 used by the data sending nodes 200 for transmitting uplink data, and not to any transmission of downlink data to any data receiving nodes 202 which in turn may use a fixed or wireless connection for receiving the data over some access network which is not necessarily the one used by the respective sending nodes 200.

A radio communication is established for each data sending node by means of assigned ratio or portion of radio resources of the shared radio link 204. This figure further illustrates a scheduler 208 which is responsible for assigning individual radio resources to the data sending nodes 200 according to their assigned ratios or portions. Further, a quality detector 210 is also shown which performs or obtains quality measurements on the radio channels, e.g. based on reference signals which are commonly transmitted from the data sending nodes 200. It should be noted that the terms "rate controlling node", "scheduler" and "quality detector" are used in this description merely to indicate their functions while they could be named otherwise for different network types depending on the terminology used.

In this solution, both the current load on the shared radio link 204 and the maximum data rate that can be achieved on the used radio channel are taken into account when determining which data rate to recommend for the respective communications. In order to do this, the rate controlling node 206 obtains a current load on the shared radio link from the scheduler 208, as illustrated by an action 2:1. The rate controlling node 206 also obtains a current quality of the respective radio channels from the quality detector 210, in another action 2:2.

The rate controlling node 206 further obtains device capabilities valid for the respective data sending nodes 200, as schematically shown by an action 2:3. For example, each communicating node 200 may signal their individual device capabilities to the serving network node that provides the shared radio link and the rate controlling node 206 can obtain this information from the network node. Alternatively, the individual device capabilities may be known beforehand which may be specified in a standard. The rate controlling node 206 may further obtain mutual device capabilities that have been negotiated and agreed by the data sending and data receiving nodes 200, 202 of a data communication which can be used for determining what data rates these nodes are capable of using. As mentioned above, the device capabilities of a communicating node may include a maximum bitrate that the node is capable of using which thereby limits the maximum flow data rate.

A following action 2:4 illustrates that the rate controlling node 206 selects a data rate to recommend for the data communication, based on the information obtained in actions 2:1-2:3. As indicated above, the minimum, i.e. the lowest value, of a fair data rate and a maximum flow data rate is selected in this action to be the recommended data rate. Some examples and embodiments of how this could be performed will be described later below. A final action 2:5 illustrates that the rate controlling node 206 signals a recommended data rate, as selected in action 2:4, to the respective data sending nodes 200.

Figure 3:
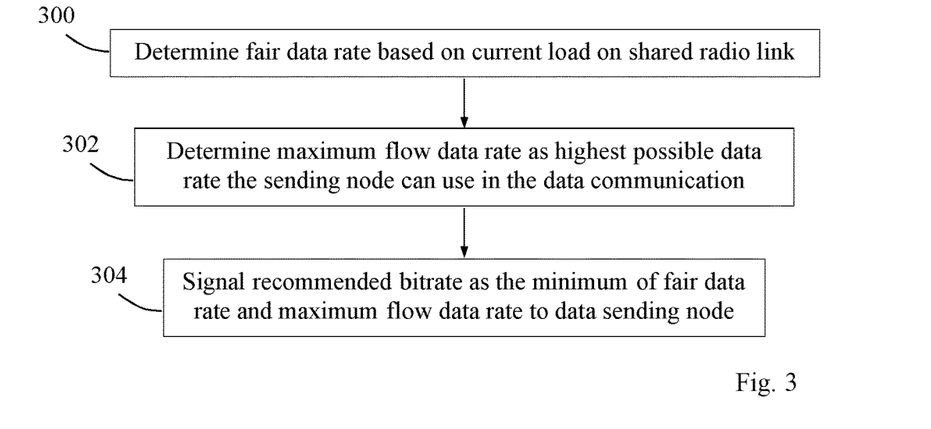
FIG. 3 is a flow chart illustrating an example of a procedure in a rate controlling node, according to further possible embodiments.

An example of how the solution may be employed will now be described with reference to the flow chart in FIG. 3 which illustrates a procedure with actions performed by a rate controlling node, to accomplish the functionality described above. The rate controlling node is operative to provide a recommended data rate for a communication i of data on a radio channel between a data sending node and a data receiving node over a shared radio link, e.g. in the manner described above for the rate controlling node 206. The communication that is subject to this procedure is denoted "i" in the following. According to some possible embodiments, the data rate(s) discussed in this description may be related to any of: bitrate, frame rate and block rate.

A first action 300 illustrates that the rate controlling node determines a fair data rate $R_i$ for the data communication i based on a current load on the shared radio link. The current load on the shared radio link may be indicated by the number N of ongoing data communications and/or the amount of currently occupied radio resources on the shared radio link. For example, the rate controlling node may obtain the current load on the shared radio link from a scheduler entity such as the scheduler 208 shown in FIG. 2. This action may be performed according to any of the following example embodiments.

In a possible embodiment, the rate controlling node may determine the fair data rate $R_i$ used by the data sending node for the data communication i by splitting a total amount of available radio resources of the shared radio link between all communications currently using the shared radio link. This split of the available radio resources may be equal such that each communication will get the same amount of radio resources, or the split may be non-equal such that one or more communications may get a greater amount of radio resources than the other communications depending on service requirements and/or priority. For example, a streaming video service typically requires more radio resources than a streaming audio service. The share of radio resources that is available for the data communication i can then be translated into the fair data rate $R_i$ by estimating how many bits that can be transmitted on the given amount of radio resources. The number of possible bits per resource may be different for different communications.

In another possible embodiment, if equal split of radio resources is employed, the rate controlling node may determine the fair data rate $R_i$ by multiplying an equal share u=1/N of the number N of communications using the shared radio link to a total maximum data rate $Q_i$ such that $$R_i = u \cdot Q_i$$

where the total maximum data rate $Q_i$ is the data rate that can be achieved if all radio resources of the shared radio link were used by the data sending node for the data communication i. The total maximum data rate $Q_i$ can thus be calculated from the total number of radio resources that the shared radio link is able to provide per time unit and the number of bits per radio resource.

In a further possible embodiment, the rate controlling node may estimate the total maximum data rate $Q_i$ based on a measured quality of the radio channel used for the data communication. Basically, if the overall quality of the used radio channel is "bad", the number of bits per radio resource that the shared radio link is able to provide per time unit is lower than when the overall quality of the radio channel is "good". Consequently, the value of $Q_i$ and thereby also $R_i$ for a data sending node in bad radio conditions (when the measured channel quality is relatively low) will be lower than the values of $Q_i$ and $R_i$ in good radio conditions (when the measured channel quality is relatively high). The rate controlling node may obtain the current quality of the shared radio link from a quality detecting or measuring entity such as the quality detector 210 shown in FIG. 2, or from the above-mentioned scheduler entity.

In a next action 302, the rate controlling node also determines a maximum flow data rate $R_{max,i}$ for the data communication i as a highest possible data rate that the data sending node is able to use in the data communication. Action 302 may be performed according to any of the following example embodiments. In a possible embodiment, the rate controlling node may determine the maximum flow data rate $R_{max,i}$ based on device capabilities of at least the data sending node. The device capabilities may be obtained directly from the data sending node or from the radio node that provides the shared link, or they may be known beforehand. The rate controlling node may also determine $R_{max,i}$ further based on a current quality of the radio channel used for the data communication which may be obtained from a quality detecting or measuring entity such as the quality detector 210 shown in FIG. 2, or from the above-mentioned scheduler entity.

In another possible embodiment, the rate controlling node may determine the maximum flow data rate $R_{max,i}$ based on the above-described total maximum data rate $Q_i$ and a maximum utilization factor $U_{max,i}$ such that $$R_{max,i} = U_{max,i} \cdot Q_i$$

where the total maximum data rate $Q_i$ is, as explained above, the data rate that can be achieved by using all radio resources of the shared radio link for the data communication. Further, the maximum utilization factor $U_{max,i}$ is dependent on device capabilities of the data sending node including a maximum transmit power $P_{max,i}$ that the data sending node is capable of using. $P_{max,i}$ is a device-specific parameter that indicates its power ability, and devices for wireless communication are often classified into power classes according to their value of $P_{max,i}$. The parameter $U_{max,i}$ may be specified as a device capability as such or it may be determined according to any of the following further embodiments.

Another possible embodiment is that the rate controlling node may calculate the maximum utilization factor $U_{max,i}$ based on the maximum transmit power $P_{max,i}$ of the data sending node and a maximum allowed transmit power per resource block $P_{RB}$ according to power control of the data sending node, such that $$U_{max,i} = P_{max,i}/P_{RB}$$

Typically, the data sending node performs power control based on rules provided by the serving network node and radio channel measurements. Another possibility is that the serving network node performs and enforces power control by signaling power control commands to the data sending node. The power control commands can be to either increase or decrease the currently used power, or may include the above parameter $P_{RB}$. The purpose of power control is to limit any interference that the data sending node may generate by transmitting its data in the data communication, which can thus be used as input for determining $U_{max,i}$ in this embodiment also knowing the value of parameter $P_{RB}$.

In another possible embodiment, the rate controlling node may calculate the maximum utilization factor $U_{max,i}$ further based on a margin factor $M_{change}$ which is between 0 and 1 depending on changes of data throughput of the radio channel, and a compensation factor $C_{txop}$ which is an estimate for an expected ratio of transmission opportunities that will be available to the data communication, such that $$U_{max,i} = \frac{P_{max,i}}{P_{RB}} M_{change} C_{txop}$$

In more detail, the margin factor $M_{change}$ provides a margin or compensation to protect against the fluctuation of radio channel quality. If the variation in channel quality is large, the margin factor $M_{change}$ must be smaller which results in a lower value of the maximum flow data rate $R_{max,i}$ according to the above formulas. Further, the compensation factor $C_{txop}$ is an estimate of how large ratio of the following transmission opportunities that that particular data communication will be allowed to transmit on the shared radio link. This ratio may be estimated based on principles or rules used by the scheduler. In many cases $C_{txop}$ is 1 since a data communication that is limited in this way is likely to get highest priority in the scheduler.

Having determined the fair data rate $R_i$ and the maximum flow data rate $R_{max,i}$ e.g. according to any of the above embodiments, the rate controlling node then signals a recommended data rate for the data communication as a minimum of the determined fair data rate $R_i$ and the determined maximum flow data rate $R_{max,i}$ to the data sending node, in a final shown action 304. Thus, if $R_i$ is lower than $R_{max,i}$ the rate controlling node will signal $R_i$ to the data sending node, while if $R_{max,i}$ is lower than $R_i$ the rate controlling node will signal $R_{max,i}$ to the data sending node. The lowest one of the fair data rate $R_i$ and the maximum flow data rate $R_{max,i}$ will thus effectively represent a limiting "bottleneck" for the data communication.

Thereby, the recommended data rate should be fully supported by the shared radio link and the data channel used, and can thus be used in the data communication without getting unwanted disturbances and interruptions, at least not caused by the uplink transmission from the data sending node on the shared radio link. It should be noted that disturbances and interruptions may still be caused by any shortcomings and limitations in other parts of the communication path, which is however not the subject of this solution. The index "i" in the various parameters described above for FIG. 3 is used to indicate that the parameters are valid for the data communication i that is subject to the procedure, while other values of said parameters may be obtained for other communications on the shared radio link.

Figure 4:
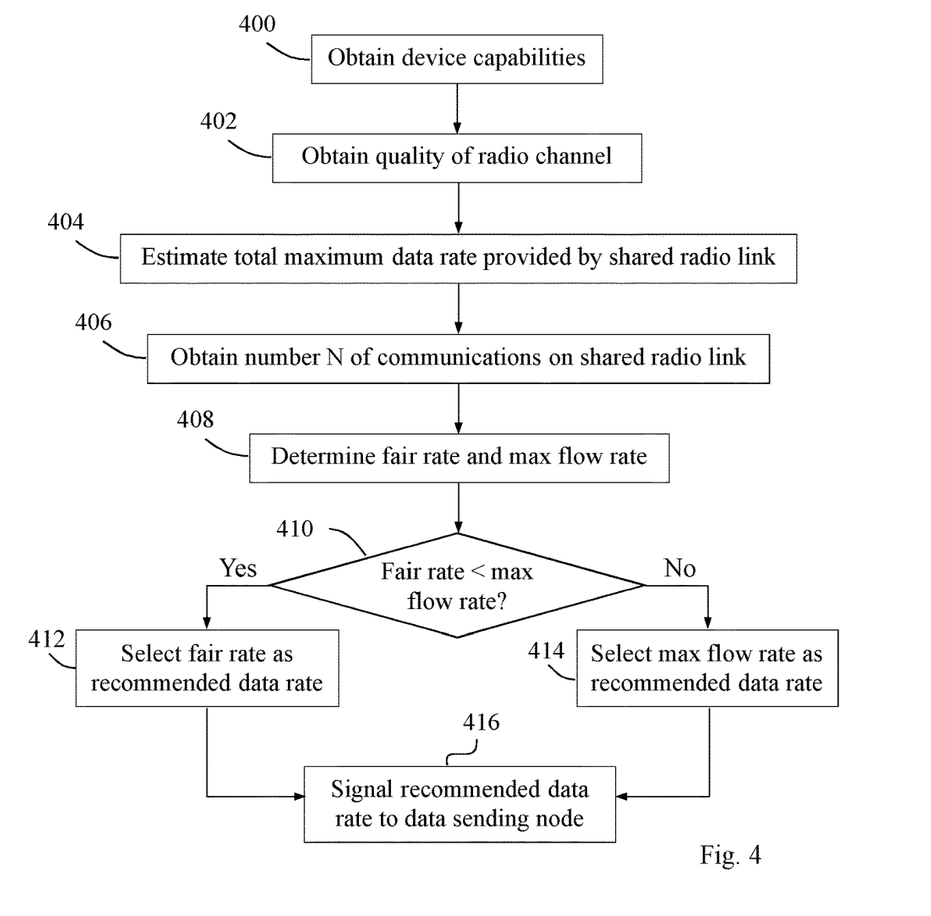
FIG. 4 is a flow chart illustrating another example of a procedure in a rate controlling node when the solution is used, according to further possible embodiments.

Another example of a procedure that may be performed by a rate controlling node, will now be described with reference to the flow chart in FIG. 4, which is a more detailed variant of the procedure illustrated in FIG. 3. In FIG. 4, several of the above-described embodiments are employed as follows. A first action 400 illustrates that the rate controlling node obtains device capabilities of at least the data sending node. In another action 402, the rate controlling node obtains the quality of the radio channel used for the data communication i. The rate controlling node further estimates, in an action 404, the total maximum data rate $Q_i$ that the shared radio link can provide, based on the quality of the radio channel obtained in action 402.

Another action 406 illustrates that the rate controlling node further obtains the number N of ongoing data communications on the shared radio link, which indicates the current load on the shared radio link. The rate controlling node may alternatively or additionally obtain the amount of currently occupied radio resources as an indication of the current load on the shared radio link. The rate controlling node then determines the fair data rate $R_i$ and the maximum flow data rate $R_{max,i}$ in an action 408, e.g. in the manner described above for actions 300 and 302.

If it is determined in a next action 410 that the fair data rate $R_i$ is lower than the maximum flow data rate $R_{max,i}$ the rate controlling node selects the fair data rate $R_i$ as recommended data rate in another action 412. Otherwise, If it is determined in action 410 that the fair data rate $R_i$ is not lower than the maximum flow data rate $R_{max,i}$ the rate controlling node selects the maximum flow data rate $R_{max,i}$ as recommended data rate in an alternative action 414. Finally, the rate controlling node signals the selected recommended data rate to the data sending node, in a last shown action 416, which thus corresponds to action 304.

Figure 5:
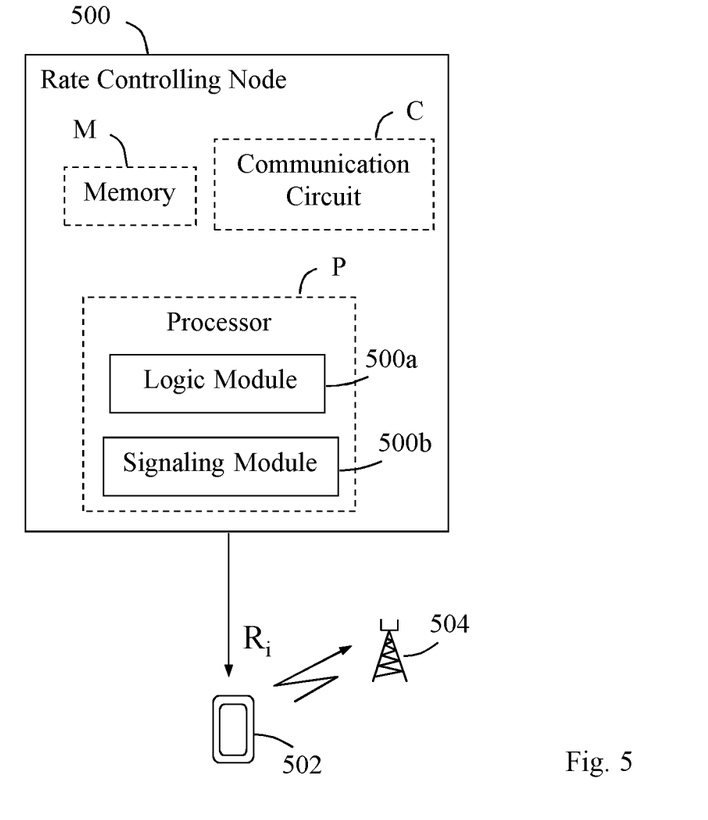
FIG. 5 is a block diagram illustrating a rate controlling node in more detail, according to further possible embodiments.

The block diagram in FIG. 5 illustrates another detailed but non-limiting example of how a rate controlling node 500 may be structured to bring about the above-described solution and embodiments thereof. In this figure, the rate controlling node 500 may thus be configured to operate according to any of the examples and embodiments of employing the solution as described above, where appropriate, and as follows. The rate controlling node 500 in this example is shown to have configuration that comprises a processor "P", a memory "M" and a communication circuit "C" with suitable equipment for receiving and transmitting information and data in the manner described herein.

The communication circuit C in the rate controlling node 500 thus comprises equipment configured for communication with a data sending node 502, using one or more suitable communication protocols depending on implementation. The data sending node 502 is served by a network node 504 in which the rate controlling node 500 may be implemented, although the solution is not limited thereto. As in the examples discussed above, the rate controlling node 500 may be configured or arranged to perform the actions of the flow charts illustrated in FIG. 3 and FIG. 4 in the manner described above. These actions may be performed by means of functional modules or units in the processor P in the rate controlling node 500 as described below.

The rate controlling node 500 is arranged to provide a recommended data rate for a communication of data on a radio channel between the data sending node 502 and a data receiving node, not shown, over a shared radio link. The rate controlling node 500 thus comprises the processor P and the memory M, said memory comprising instructions executable by said processor, whereby the rate controlling node 500 is operable as follows.

The rate controlling node 500 is operable to determine a fair data rate $R_i$ for the data communication based on a current load on the shared radio link. This first determining operation may be performed by a logic module 500a in the rate controlling node 500 in the manner described for action 300 above. The rate controlling node 500 is also operable to determine a maximum flow data rate $R_{max,i}$ for the data communication based on a current quality of the radio channel used for the data communication and device capabilities of at least the data sending node. This second determining operation may be performed by the logic module 500a in the manner described for action 302 above. The rate controlling node 500 is further operable to signal a recommended data rate for the data communication as a minimum of the determined fair data rate $R_i$ and the determined maximum flow data rate $R_{max,i}$ to the data sending node 502. This operation may be performed by a signalling unit 500b in the manner described for action 304 above.

It should be noted that FIG. 5 illustrates some possible functional units in the rate controlling node 500 and the skilled person is able to implement these functional units in practice using suitable software and hardware. Thus, the solution is generally not limited to the shown structure of the rate controlling node 500, and the functional units 500a-b may be configured to operate according to any of the features described in this disclosure, where appropriate.

The embodiments and features described herein may thus be implemented in a computer program comprising instructions which, when executed on at least one processor, cause the at least one processor to carry out the above actions and functions e.g. as described for any of FIGS. 1-5. Further, the above-described embodiments may be implemented in a carrier containing the above computer program, wherein the carrier could be any of an electronic signal, optical signal, radio signal, or computer readable storage medium. The computer readable storage medium may be a compact disc or other carrier suitable for holding the computer program. Some examples of how the computer program and the carrier can be realized in practice are outlined below, and with further reference to FIG. 5.

The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

The memory M may comprise the above-mentioned computer readable storage medium or carrier on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM). The program modules could in alternative embodiments be distributed on different computer program products in the form of memories within the rate controlling node 500.

While the solution has been described with reference to specific exemplifying embodiments, the description is generally only intended to illustrate the inventive concept and should not be taken as limiting the scope of the solution. For example, the terms "rate controlling node", "data sending node", "data receiving node", "fair data rate", "maximum flow data rate", "total maximum data rate", "maximum utilization factor", and "maximum transmit power" have been used throughout this disclosure, although any other corresponding entities, functions, and/or parameters could also be used having the features and characteristics described here. The solution is defined by the appended claims.

The invention claimed is:

1. A method performed by a rate controlling node for providing a recommended data rate for a communication i of data on a radio channel between a data sending node and a data receiving node over a shared radio link, the method comprising:

determining a fair data rate $R_i$ for the data communication i based on a current load on the shared radio link;

determining, based on a current quality of the radio channel, a maximum flow data rate $R_{max,i}$ for the data communication i as a highest possible data rate that the data sending node is able to use in the data communication i, wherein the current quality of the radio channel is measured based on one or more reference signals transmitted from the data sending node, wherein determining the maximum flow data rate $R_{max,i}$ is further based on a total maximum data rate $Q_i$ and a maximum utilization factor $U_{max,i}$ such that $R_{max,i}=U_{max,i} \cdot Q_i$, wherein the total maximum data rate $Q_i$ is a data rate that is achieved by using all radio resources of the shared radio link for the data communication i and the maximum utilization factor $U_{max,i}$ is dependent on device capabilities of the data sending node including a maximum transmit power $P_{max,i}$ that the data sending node is capable of using; and signalling a recommended data rate for the data communication i as a minimum of the determined fair data rate $R_i$ and the determined maximum flow data rate $R_{max,i}$ to the data sending node.

2. The method of claim 1, wherein determining the fair data rate $R_i$ for the data communication i is performed by splitting a total amount of available radio resources of the shared radio link between all communications currently using the shared radio link.

3. The method of claim 2, wherein determining the fair data rate $R_i$ is further performed by multiplying an equal share $u=1/N$ of N number of communications using the shared radio link to the total maximum data rate $Q_i$, such that $R_i=u \cdot Q_i$.

4. The method of claim 3, wherein the total maximum data rate $Q_i$ is estimated based on the measured current quality of the radio channel used for the data communication i.

5. The method of claim 1, wherein the method further comprises calculating the maximum utilization factor $U_{max,i}$ based on the maximum transmit power $P_{max,i}$ of the data sending node and a maximum allowed transmit power per resource block $P_{RB}$ according to power control of the data sending node, such that $U_{max,i}=P_{max,i}/P_{RB}$.

6. A rate controlling node arranged to provide a recommended data rate for a communication i of data on a radio channel between a data sending node and a data receiving node over a shared radio link, the rate controlling node comprising a processor and a memory, said memory comprising instructions that when executed by said processor cause the rate controlling node to:

determine a fair data rate $R_i$ for the data communication i based on a current load on the shared radio link;

determine, based on a current quality of the radio channel, a maximum flow data rate $R_{max,i}$ for the data communication i as a highest possible data rate that the data sending node is able to use in the data communication i, wherein the current quality of the radio channel is measured based on one or more reference signals transmitted from the data sending node, wherein the determination of the maximum flow data rate $R_{max,i}$ is further based on a total maximum data rate $Q_i$ and a maximum utilization factor $U_{max,i}$ such that $R_{max,i}=U_{max,i} \cdot Q_i$, wherein the total maximum data rate $Q_i$ is a data rate that is achieved by using all radio resources of the shared radio link for the data communication i and the maximum utilization factor $U_{max,i}$ is dependent on device capabilities of the data sending node including a maximum transmit power $P_{max,i}$ that the data sending node is capable of using; and signal a recommended data rate for the data communication i as a minimum of the determined fair data rate $R_i$ and the determined maximum flow data rate $R_{max,i}$ to the data sending node.

7. The rate controlling node of claim 6, wherein the instructions cause the rate controlling node to determine the fair data rate $R_i$ for the data communication i by splitting a total amount of available radio resources of the shared radio link between all communications currently using the shared radio link.

8. The rate controlling node of claim 7, wherein the instructions further cause the rate controlling node to determine the fair data rate $R_i$ by multiplying an equal share $u=1/N$ of N number of communications using the shared radio link to the total maximum data rate $Q_i$ such that $R_i=u \cdot Q_i$.

9. The rate controlling node of claim 8, wherein the instructions further cause the rate controlling node to estimate the total maximum data rate $Q_i$ based on the measured current quality of the radio channel used for the data communication i.

10. The rate controlling node of claim 6, wherein the instructions further cause the rate controlling node to calculate the maximum utilization factor $U_{max,i}$ based on the maximum transmit power $P_{max,i}$ of the data sending node and a maximum allowed transmit power per resource block $P_{RB}$ according to power control of the data sending node, such that $U_{max,i}=P_{max,i}/P_{RB}$.

11. The rate controlling node of claim 10, wherein the instructions further cause the rate controlling node to calculate the maximum utilization factor $U_{max,i}$ further based on a margin factor $M_{change}$ which is between 0 and 1 depending on changes of data throughput of the radio channel and a compensation factor $C_{txop}$ which is an estimate for an expected ratio of transmission opportunities that will be available to the data communication i, such that $$U_{max,i} = \frac{P_{max,i}}{P_{RB}} M_{change} C_{txop}.$$

12. The rate controlling node of claim 6, wherein the data rate is related to any of: bitrate, frame rate, and block rate.

13. A rate controlling node arranged to provide a recommended data rate for a communication of data on a radio channel between a data sending node and a data receiving node over a shared radio link, the rate controlling node comprising:
- a logic module configured to determine a fair data rate $R_i$ for the data communication based on a current load on the shared radio link, and to determine a maximum flow data rate $R_{max,i}$ for the data communication based on a current quality of the radio channel used for the data communication, wherein the current quality of the radio channel is measured based on one or more reference signals transmitted from the data sending node, wherein the logic module is configured to determine the maximum flow data rate $R_{max,i}$ further based on a total maximum data rate $Q_i$ and a maximum utilization factor $U_{max,i}$ such that $R_{max,i} = U_{max,i} \cdot Q_i$, wherein the total maximum data rate $Q_i$ is a data rate that is achieved by using all radio resources of the shared radio link for the data communication i and the maximum utilization factor $U_{max,i}$ is dependent on the device capabilities of the data sending node including a maximum transmit power $P_{max,i}$ that the data sending node is capable of using; and
- a signalling module configured to signal a recommended data rate for the data communication as a minimum of the determined fair data rate $R_i$ and the determined maximum flow data rate $R_{max,i}$ to the data sending node.

* * * * *